US005896420A

United States Patent [19]
Kaku et al.

[11] Patent Number: 5,896,420
[45] Date of Patent: Apr. 20, 1999

[54] TRANSMISSION APPARATUS HAVING ECHO CANCELLATION FACILITY

[75] Inventors: Takashi Kaku; Takeshi Asahina; Toyomi Obikawa; Ryoji Okita, all of Kawasaki, Japan

[73] Assignee: Fujitsu Limited, Kanagawa, Japan

[21] Appl. No.: 08/749,346

[22] Filed: Nov. 21, 1996

[30] Foreign Application Priority Data

Feb. 19, 1996 [JP] Japan .................................. 8-030628

[51] Int. Cl.$^6$ ........................................ H04B 3/20
[52] U.S. Cl. ........................ 375/285; 375/296; 375/346; 370/286; 379/402; 379/406; 379/410
[58] Field of Search ........................... 379/406–411, 339; 375/222, 285, 296, 346; 370/228, 286

[56] References Cited

U.S. PATENT DOCUMENTS

| | | | |
|---|---|---|---|
| 4,464,545 | 8/1984 | Werner | 370/286 |
| 4,652,703 | 3/1987 | Lu et al. | 379/339 |
| 4,796,296 | 1/1989 | Amada et al. | 379/410 |
| 5,347,539 | 9/1994 | Sridhar et al. | 375/222 |

FOREIGN PATENT DOCUMENTS 1 203 802  9/1970  United Kingdom.

*Primary Examiner*—Amanda T. Le
*Attorney, Agent, or Firm*—Helfgott & Karas, P.C.

[57] ABSTRACT

A transmission apparatus, connected via a hybrid circuit to a line, such as a modulator-demodulator which can perform stable echo cancellation, whether the level of the far-end echo is high or not, provided with a transmission unit which generates a transmission signal to be transmitted to the line via the hybrid circuit, a reception unit which receives the reception signal supplied from the line via the hybrid circuit, and a superimposing means for superimposing the reception signal applied to the hybrid circuit onto the transmission signal. The transmission signal onto which the reception signal is superimposed by the superimposing means is transmitted to the line via the hybrid circuit.

8 Claims, 14 Drawing Sheets

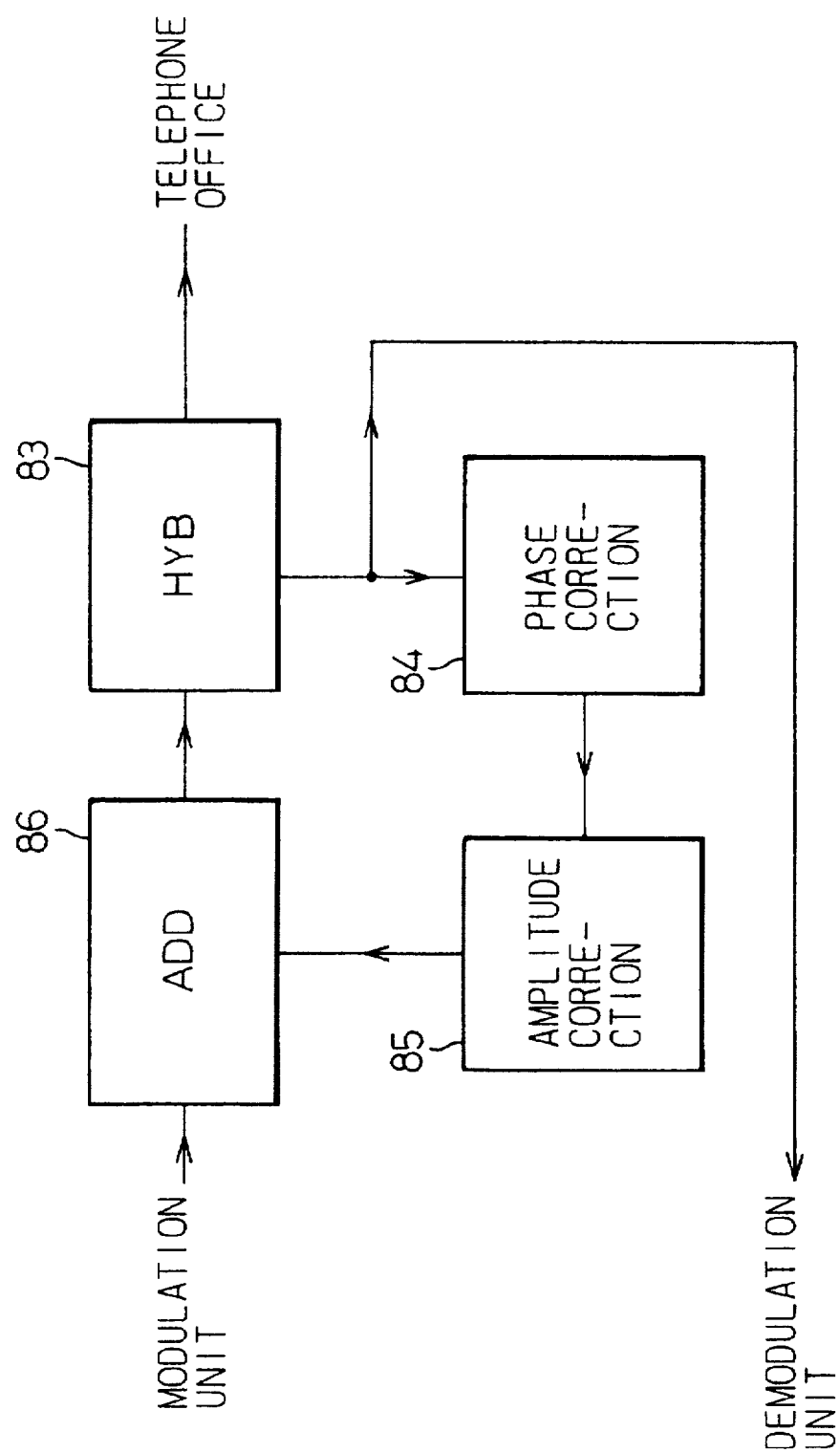

TRANSMISSION APPARATUS HAVING ECHO CANCELLATION FACILITY

BACKGROUND OF THE INVENTION

1. Field of the Invention

The present invention relates to a transmission apparatus, more particularly relates to a transmission apparatus having an echo cancellation facility.

In a modulator-demodulator for performing for example two-wire full-duplex communication, the transmission signal and the reception signal are separated by using a hybrid circuit. In this case, there arises a problem in that the transmission side signal ends up wrapping around the reception side via the hybrid circuit. For this reason, the conventional practice has been to improve the S/N ratio of the reception signal by performing echo cancellation to remove the wrapped around transmission signal from the reception signal.

The present invention will be explained below taking as an example a modulator-demodulator (modem), but it is also possible to apply the present invention to other types of transmission apparatuses.

2. Description of the Related Art

As will be explained in detail later by using the drawings, in the conventional echo cancellation methods, there is the possibility of occurrence of the following problems—particularly concerning far-end echo.

First, there is the case where the far-end echo level is small. In this case, there arises the following problem. An echo generated from the hybrid circuit in a telephone office far away from the transmission side modem is subjected to analog/digital conversion by an A/D converter in the same telephone office and transmitted to a four-wire line.

In the A/D converter, the output signal exhibits a relatively good linearity in a case where the level of the input signal is high, but in a case where the level of the input signal is low, when performing analog/digital conversion, an undesired nonlinear region of the A/D converter is used, where the linearity has been degraded. For this reason, distortion is caused in the signal output from the A/D converter in the telephone office.

On the other hand, the echo estimation for the echo cancellation is carried out based on the signal transmitted from a modulation unit in the local modem, therefore, basically, echo cancellation cannot be carried out with respect to a signal different from the signal transmitted from the local modem.

Due to the occurrence of the above distortion of the signal, however, it is not fully possible to perform echo cancellation when finding the difference between the signal output from the modulation unit in the local modem and the echo component contained in the signal received from the telephone office. The far-end echo component remains in that reception signal as it is. For this reason, as a result, the S/N ratio of the reception signal is deteriorated, and thus the possibility of occurrence of data error becomes higher where demodulation is carried out.

Second, there can be mentioned a case where the level of the far-end echo is too large. In this case, since the echo component contained in the reception signal supplied from a distant telephone office via a near telephone office to the local modem is too large, even if echo cancellation is carried out in response to the signal from the modulation unit in this modem, sufficient echo cancellation cannot be carried out and the echo component remains in the above reception signal. In this case as well, the S/N ratio of the reception signal is deteriorated, and a data error is caused in the result of demodulation.

In this way, when cancelling a far-end echo, the conventional apparatuses have a problem in that the echo could not be sufficiently cancelled if the level thereof is either too small or too large.

SUMMARY OF THE INVENTION

Therefore, an object of the present invention is to provide a transmission apparatus (modem) which can perform stable echo cancellation particularly for a far-end echo without regard as to the level of the echo.

To attain the above object, the present invention provides a transmission apparatus, connected via a hybrid circuit to a line, provided with a transmission unit which generates a transmission signal to be transmitted to the line via the hybrid circuit; a reception unit which receives the reception signal supplied from the line via the hybrid circuit; and a superimposing means for superimposing that reception signal applied to the hybrid circuit onto the transmission signal. The transmission signal onto which the reception signal is superimposed by the superimposing means is transmitted to the line via the hybrid circuit.

BRIEF DESCRIPTION OF THE DRAWINGS

The above object and features of the present invention will be more apparent from the following description of the preferred embodiments given with reference to the accompanying drawings, wherein:

FIG. 7 is a block diagram of the circuit in an important part of the modem of FIG. 5;

DESCRIPTION OF THE PREFERRED EMBODIMENTS

Before describing the embodiments of the present invention, the related art and the disadvantages therein will be described with reference to the related figures.

Figure 10:
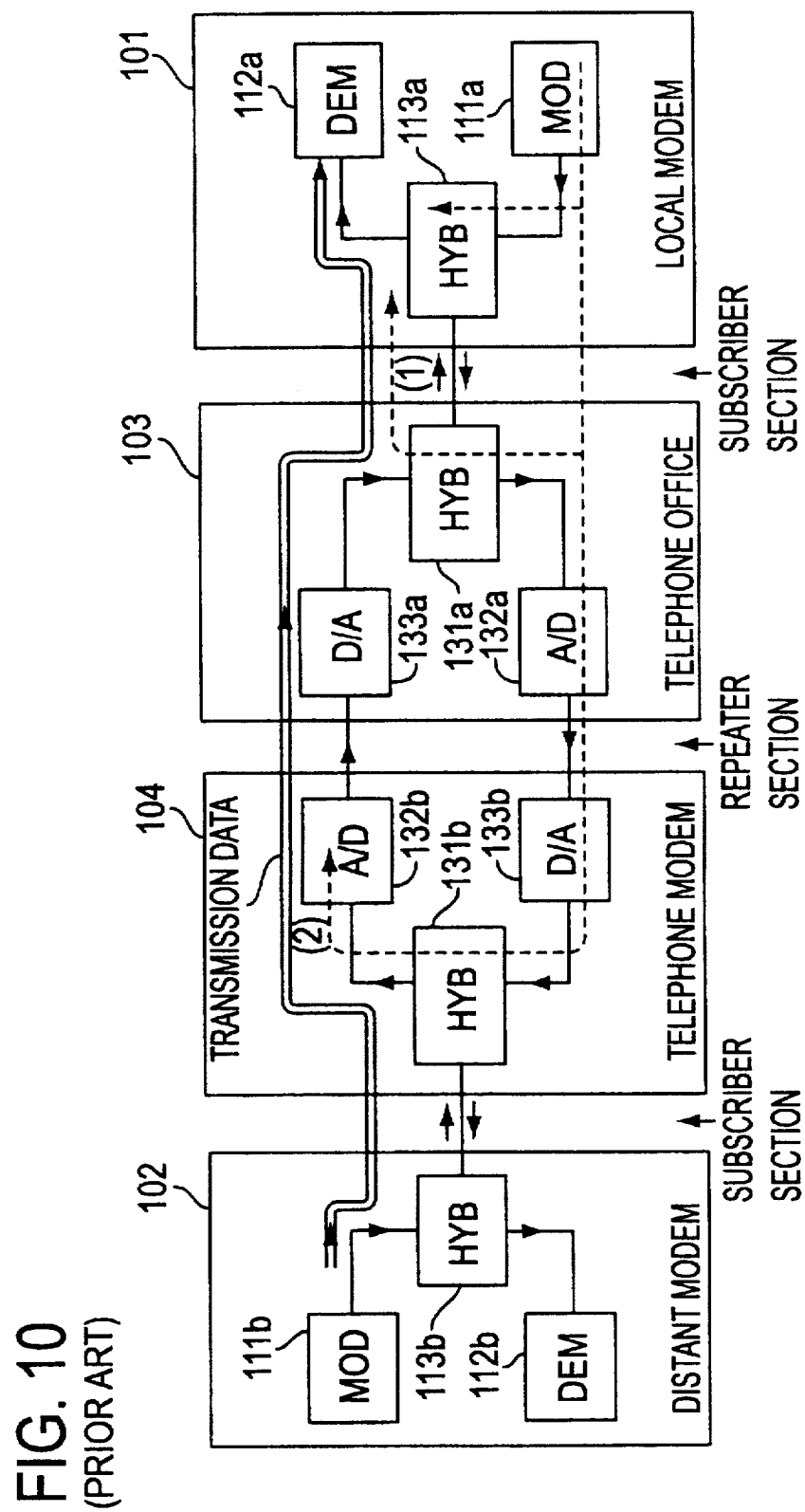
FIG. 10 is a view explaining general two-wire full-duplex communication.

FIG. 10 is a view explaining a case where two-wire full-duplex communication is carried out by using a conventional modulator-demodulator (modem). In FIG. 10, 101 is a local modem, 102 is a distant modem, 103 is a local telephone office, and 104 is a distant telephone office. Further, the double arrow line indicates the path of the transmission data transmitted from the distant modem 102 to the local modem 101.

The local modem 101 provides a modulation unit (MOD) 111a for modulating the transmission signal and a demodulation unit (DEM) 112a for demodulating the received signal inside this. Further, the modulation unit 111a and the demodulation unit 112a are connected to a hybrid circuit (HYB) 113a. The hybrid circuit 113a is connected to a two-wire line across an illustrated "subscriber section". The hybrid circuit 113a transmits the signal from the modulation unit 111a to the two-wire line and, at the same time, supplies the reception signal received from the line to the demodulation unit 112a.

The distant modem 102 is provided with a modulation unit 111b, a demodulation unit 112b, and a hybrid circuit (HYB) 113b similar to the local modem 101.

The local modem 101 is connected to the telephone office 103 via a telephone line. The telephone office 103 is provided with an analog/digital converter (A/D) 132a which converts the analog transmission signal received from the local modem 101 to a digital signal and outputs the same to a four-wire digital line ("repeater section" in the view) and a digital/analog converter (D/A) 133a which converts the digital reception signal received from the "repeater section" to an analog signal.

Further, the telephone office 103 is provided with a hybrid circuit (HYB) 131a connected to the line of the subscriber section.

The telephone office 103 is connected to a telephone office 104 via a digital four-wire line. The telephone office 104 is provided with a hybrid circuit (HYB) 131b, an A/D converter (A/D) 132b, and a D/A converter (D/A) 133b similar to the telephone office 103.

When the local modem 101 is the transmission side modem, the analog signal transmitted from the local modem 101 is converted to a digital signal by the analog/digital converter 132a via the hybrid circuit 131a of the telephone office 103 and transmitted to the other telephone office 104 via the digital line.

In the other telephone office 104, the received digital signal is converted to an analog signal by the digital/analog converter 133b and transmitted to the distant modem 102 via the hybrid circuit 131b.

Figure 11:
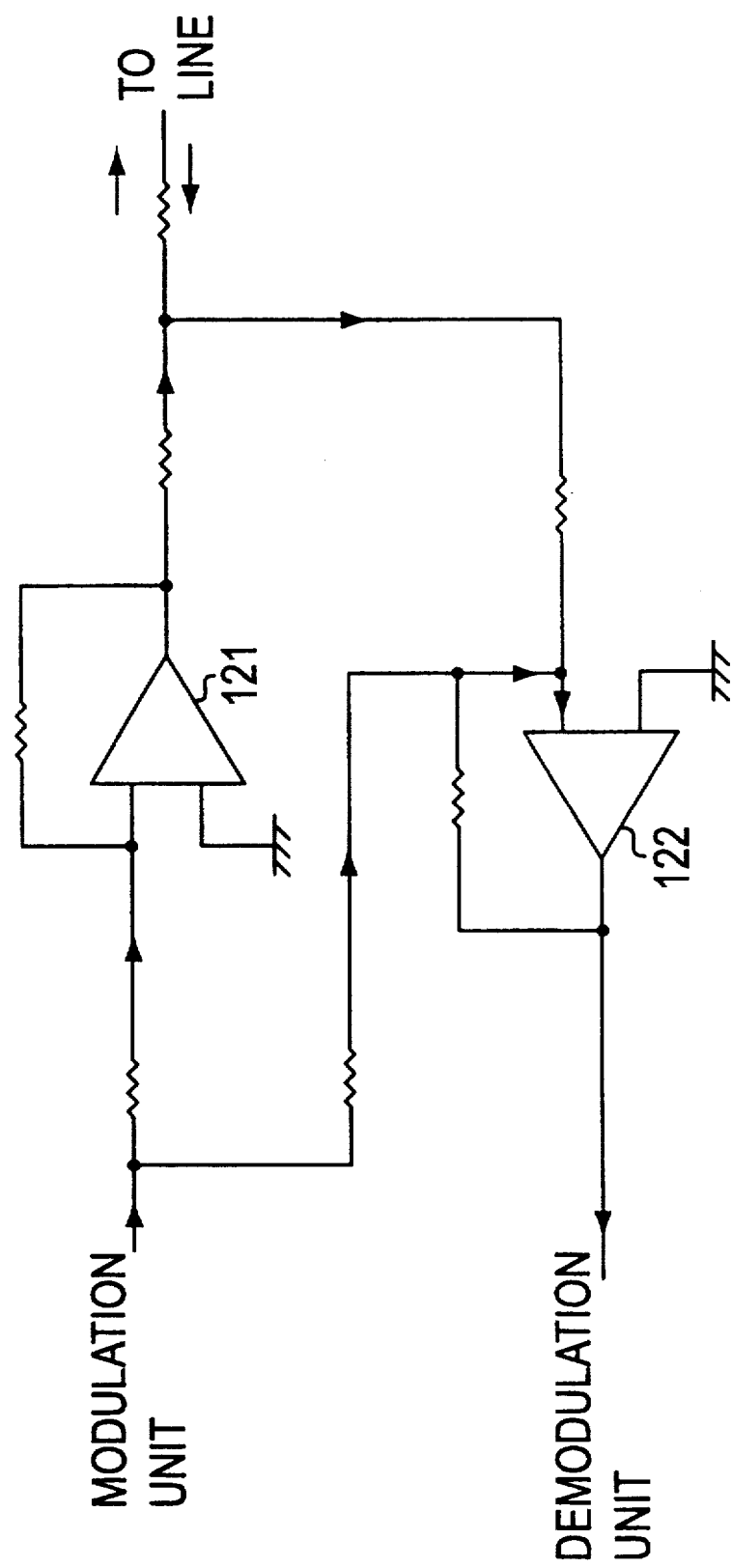
FIG. 11 is a view of a conventional hybrid circuit.

FIG. 11 is a view of an example of a conventional hybrid circuit. The hybrid circuit 120 is provided with two inverting amplifiers 121 and 122.

In order to maintain the line connection, a carrier signal is transmitted from the demodulation unit side of the modem during the transmission of data to the distant modem. Here, since impedance mismatching occurs at the hybrid coil performing the two-wire-four-wire conversion provided in the telephone office, the carrier signal which is transmitted is returned back to the reception side and therefore an echo is generated. The echo caused by the carrier signal is mixed with the reception signal received by the modem, whereby a state analogous to one where noise enters is exhibited (the echo is illustrated by the dotted line in FIG. 10).

When receiving a signal of a mixture of the received signal and carrier signal, the demodulation unit can no longer correctly demodulate the reception signal. Therefore, conventionally, as a means for removing this carrier signal, an echo canceller has been used.

Figure 12:
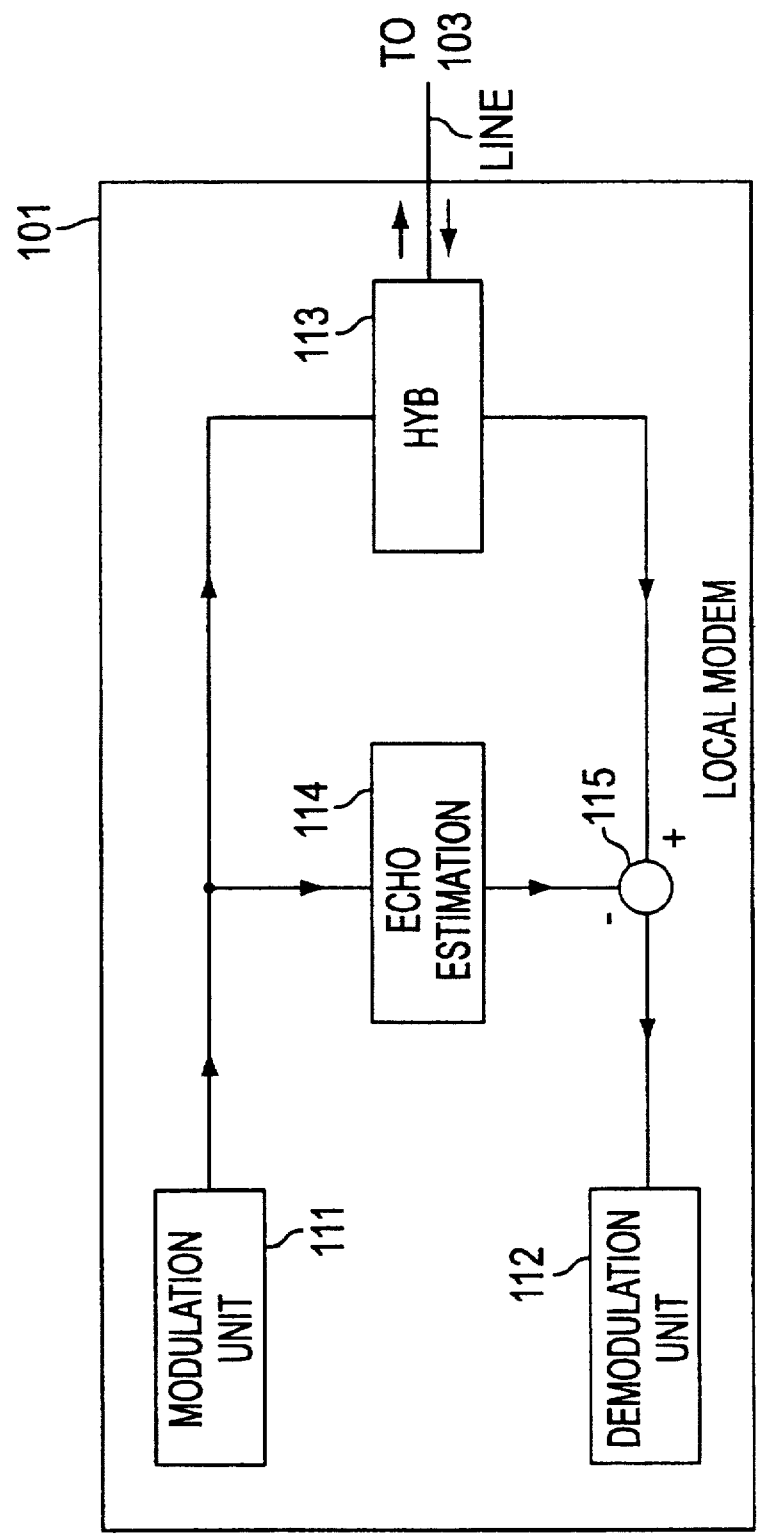
FIG. 12 is a view of an example of a modem provided with an echo cancellation facility.

FIG. 12 is a view illustrating a modem provided with the echo canceller. In the view, 111 is a modulation unit, 112 is a demodulation unit, and 113 is a hybrid circuit (HYB). These are the same as those of FIG. 10. Also, the modem 101 is further provided with an echo estimation unit 114 and an adder 115.

The echo estimation unit 114 estimates the echo component based on the signal output from the modulation unit 111. Further, the adder 115 produces the difference between the signal output from the echo estimation unit 114 and the reception signal from the distant modem received via the hybrid circuit 113 and removes the echo component caused by the hybrid circuits 131 (131a, 131b) provided in the telephone offices 103 and 104 from the reception signal.

Figure 13:
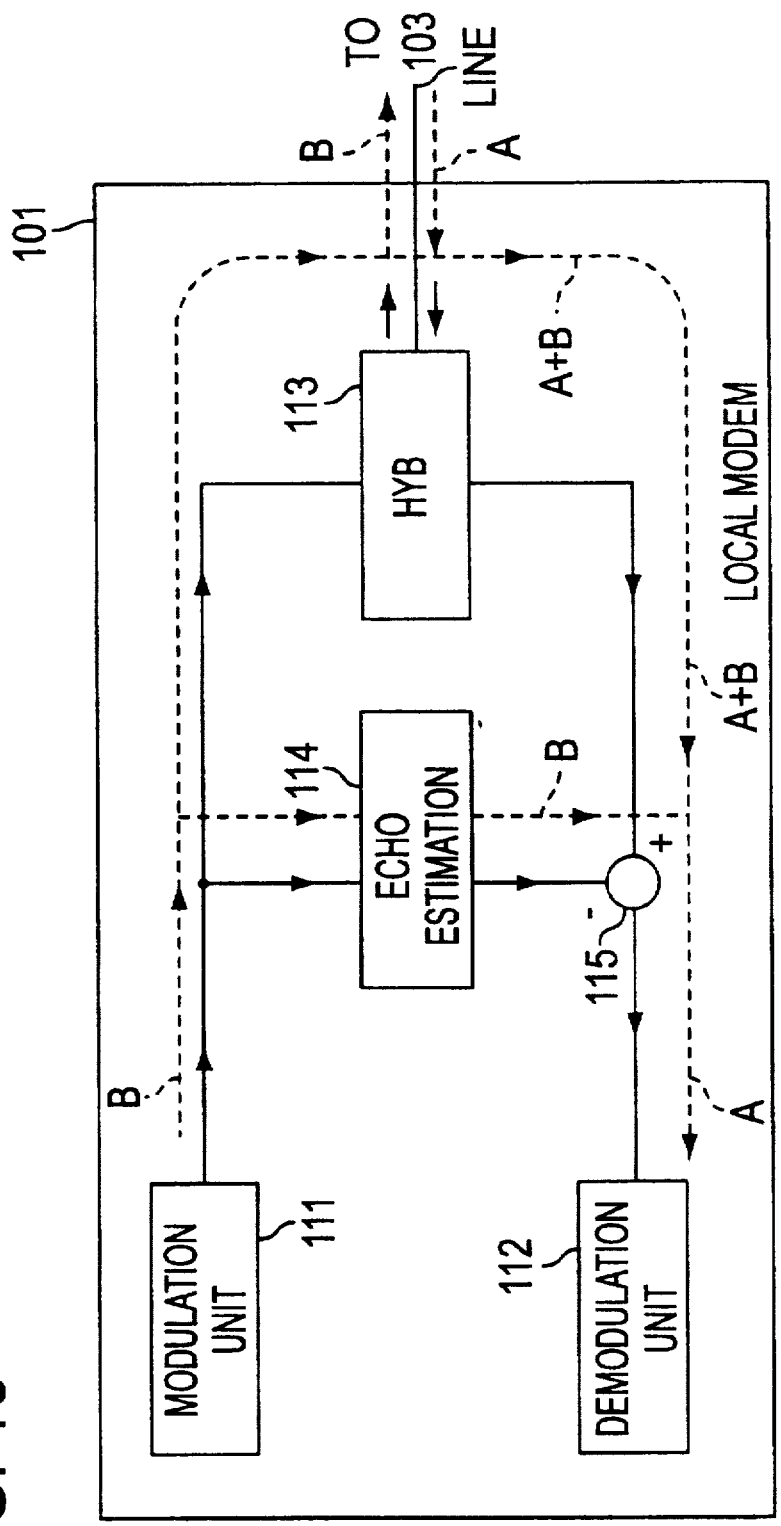
FIG. 13 is a view explaining the mechanism of echo cancellation using the modem illustrated in FIG. 6.

FIG. 13 is a view explaining the removal of the echo component using the echo canceller. In the figure, B denotes a transmission carrier output from the modulation unit, and A denotes the reception signal from the distant modem. Note that any sign marks attached to the signals A and B indicate phases of the signals throughout the specification.

The transmission carrier B output from the modulation unit 111 is output to the telephone office 103 side via the hybrid circuit (HYB) 113, but part of the output signal wraps around the reception side of the telephone office 101 from the hybrid circuit 131 provided in the telephone office 103 (see FIG. 10) and mixes with the reception signal A from the distant modem. For this reason, the reception signal output from the hybrid circuit 113 becomes a mixture such as A+B, i.e., the mixture of the reception signal and the carrier signal.

On the other hand, the transmission carrier B from the modulation unit 111 is input to the echo estimation unit 114. The echo estimation unit 114 predicts the echo component based on the input transmission carrier B and outputs a signal in accordance with the result.

Subsequently, the adder 115 produces the difference between the signal A+B from the hybrid circuit 113 and the signal B from the echo estimation unit 114. Due to this, the component of the transmission carrier B is removed from the output of the adder 115, and only the reception signal A from the distant modem is sent to the demodulation unit 112.

Here, the echo may be roughly divided into a near-end echo and a far-end echo.

The near-end echo is illustrated by the dotted line (1) of FIG. 10 and indicates the echo generated at the hybrid circuit 131a in the telephone office 103 near the local modem 101. On the other hand, the far-end echo is illustrated by the dotted line (2) of FIG. 10 and indicates the echo generated at the distant telephone office 104 far away from the local modem 101.

The two near-end echo and far-end echo generated in this way are removed by the echo canceller.

Note that, in actuality, there also exists an echo generated at the hybrid circuit in the modem. This echo is also removed by the echo canceller.

In the conventional echo cancellation methods, however, as already mentioned, there is a possibility of occurrence of the following problems—particularly concerning the far-end echo.

First, there is the case where the far-end echo level is small. In this case, there arises the following problem. An echo generated in the hybrid circuit of a telephone office 104 far away from the transmission side modem 101 is subjected to analog/digital conversion by an A/D converter 132b in the same telephone office 104 and transmitted to a four-wire line.

In the A/D converter 132b, the output signal from the A/D converter exhibits a relatively good linearity in a case where the level of the input signal is high, but in a case where the level of the input signal is low, when performing analog/digital conversion, an undesired nonlinear region of the A/D converter is used, where the linearity has been degraded. For this reason, distortion is caused in the signal output from the A/D converter 132b in the telephone office 104. In general, such an A/D converter has an companding characteristic based on the A-law or µ-law and does not have linearity.

Figure 14:
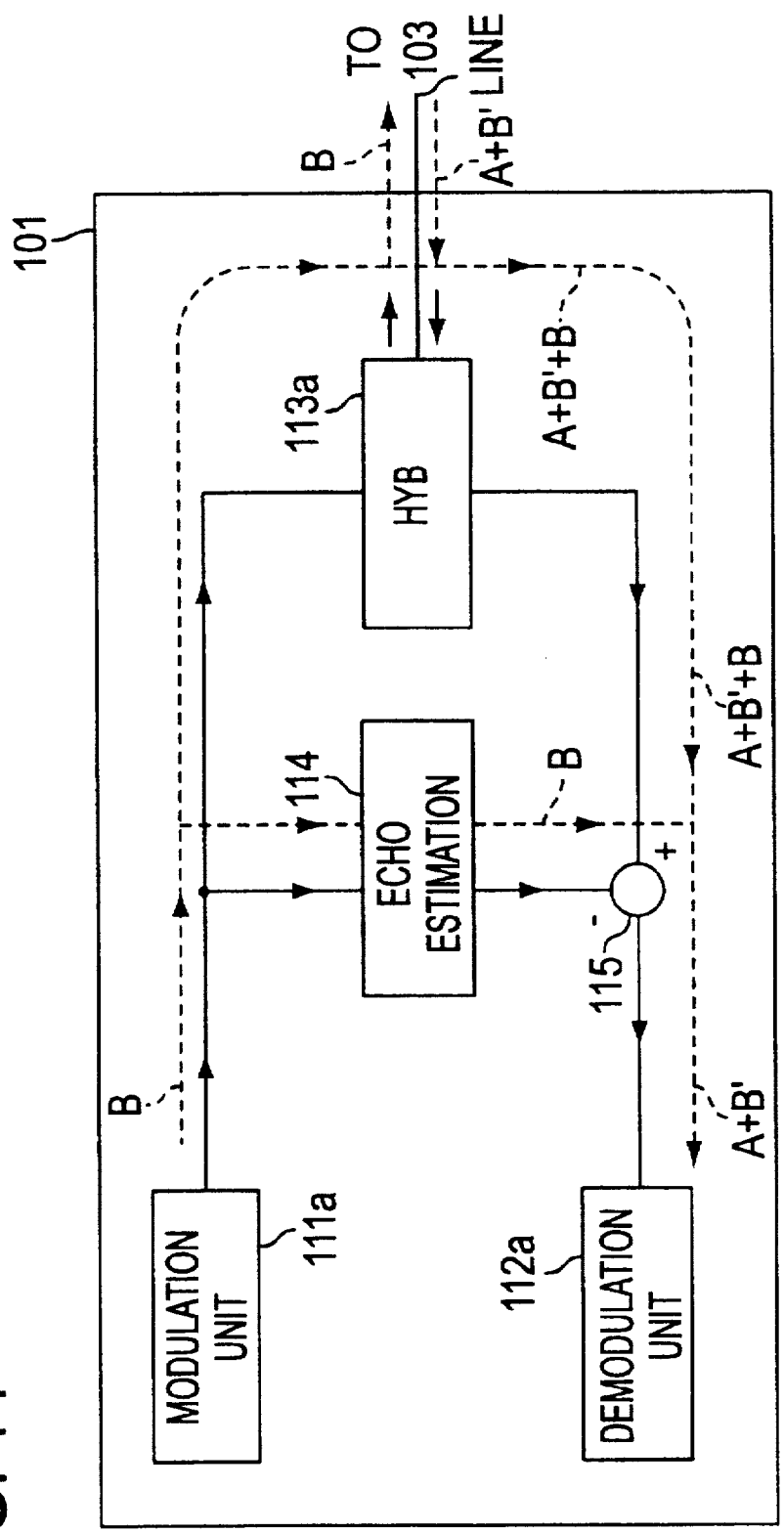
FIG. 14 is a view explaining the problem where the far-end echo component is small.

FIG. 14 is a view explaining a case where the level of the far-end echo is small.

The hybrid circuit (HYB) 113 outputs the far-end echo component in addition to the reception signal A from the distant modem 102. Here, since the A/D conversion was carried out in a region where the linearity of the A/D converter 132b was poor as mentioned before, the far-end echo component becomes the signal B' containing distortion relative to the transmission carrier B output from the modulation unit 111a.

On the other hand, the echo estimation for the echo cancellation is carried out based on the signal transmitted from a modulation unit 111a in the local modem 101, therefore, basically, echo cancellation cannot be carried out for a signal different from the signal transmitted from the local modem.

Due to the occurrence of the above distortion of the signal, however, it is not fully possible to perform echo cancellation when finding the difference between the signal B output from the modulation unit 111a in the local modem 101 and the echo component B' contained in the signal received from the telephone office 103. The far-end echo component B' remains in that reception signal as it is. For this reason, as a result, the S/N ratio of the reception signal is deteriorated, and thus the possibility of occurrence of data error becomes higher where demodulation is carried out at the demodulation unit 112a.

Second, there can be mentioned a case where the level of the far-end echo is too large. In this case, since the echo component contained in the reception signal supplied from a distant telephone office 104 via a near telephone office 103 to the local modem 101 is too large, even if echo cancellation is carried out in response to the signal from the modulation unit 111a in this modem, sufficient echo cancellation cannot be carried out and the echo component remains in the above reception signal. In this case as well, the S/N ratio of the reception signal is deteriorated, and a data error is caused in the result of demodulation.

In this way, when cancelling a far-end echo, the conventional apparatuses had a problem in that the echo could not be sufficiently cancelled if the level of the far-end echo was either too small or too large.

Therefore, the present invention provides a transmission apparatus which can perform stable echo cancellation particularly for far-end echo, whether the level thereof is high or not.

The transmission apparatus of the present invention is connected via a hybrid circuit to a line and is provided with a transmission unit which generates a transmission signal to be transmitted to the line via the hybrid circuit; a reception unit which receives the reception signal supplied from the line via the hybrid circuit; and a superimposing means for superimposing that reception signal applied to the hybrid circuit onto the transmission signal. The transmission signal onto which the reception signal is superimposed by the superimposing means is transmitted to the line via the hybrid circuit.

The present invention is particularly characterized in that the superimposing means provides an amplifying means for amplifying the reception signal and in that the reception signal amplified by the amplifying means is superimposed onto the transmission signal.

Due to this configuration, when amplifying a far-end echo component, from a distant modem, having a small signal level, analog/digital conversion can be performed using a region where the linearity of the A/D converter is good and therefore distortion can be prevented from occuring in the echo component. Due to this, the echo cancellation can be correctly carried out and the occurrence of data errors in the result of demodulation can be reduced.

Particularly, in the above configuration, the amplifying means may be constituted by an even number of inverting amplifiers. Further, the amplifying means may be provided with a first inverting amplifier for inversely amplifying the transmission signal output from the transmitting means; a second inverting amplifier for inversely amplifying the output signal from the first inverting amplifier and, at the same time, outputting a signal to the hybrid circuit; a third inverting amplifier which receives as its inputs the output signal from the second inverting amplifier, the reception signal received via the hybrid circuit, and the output of the first inverting amplifier and performs the inverse amplification of the input signal; and a fourth inverting amplifier performing the inverse amplification of the output of the third inverting amplifier, wherein the output of the fourth inverting amplifier is applied to the first inverting amplifier.

In another aspect of the present invention, the superimposing means may be provided with an inverting means for inverting the reception signal and outputting the result, wherein the reception signal inverted by the inverting means may be superimposed onto the transmission signal.

By adopting such a configuration, when the level of the far-end echo component is too large, outputting a phase component, from the distant modem, opposite to the far-end echo component enables the far-end echo component to be reduced to an extent that does not obstruct the echo cancellation.

Here, the inverting means may be constituted by an odd number of inverting amplifiers. Further, the inverting means may be provided with a first inverting amplifier for inversely amplifying the transmission signal output from the transmitting means; a second inverting amplifier which inversely amplifies the output signal from the first inverting amplifier and, at the same time, outputs the amplified signal to the hybrid circuit; and a third inverting amplifier which receives as its inputs the output signal from the second inverting amplifier, the reception signal received via the hybrid circuit, and the output of the first inverting amplifier and performs the inverse amplification of the input signals, wherein the output of the third inverting amplifier is applied to the first inverting amplifier.

Further, in the present invention, the superimposing means may be provided with a correcting means for correcting the characteristics of the signal received from the distant modem side via the line. The reception signal with characteristics corrected by the correcting means is superimposed onto the transmission signal to output.

Due to this, it is possible to correct the signal in accordance with the characteristic of the line connected to the transmission apparatuses and possible to more effectively perform the echo cancellation.

Figure 1:
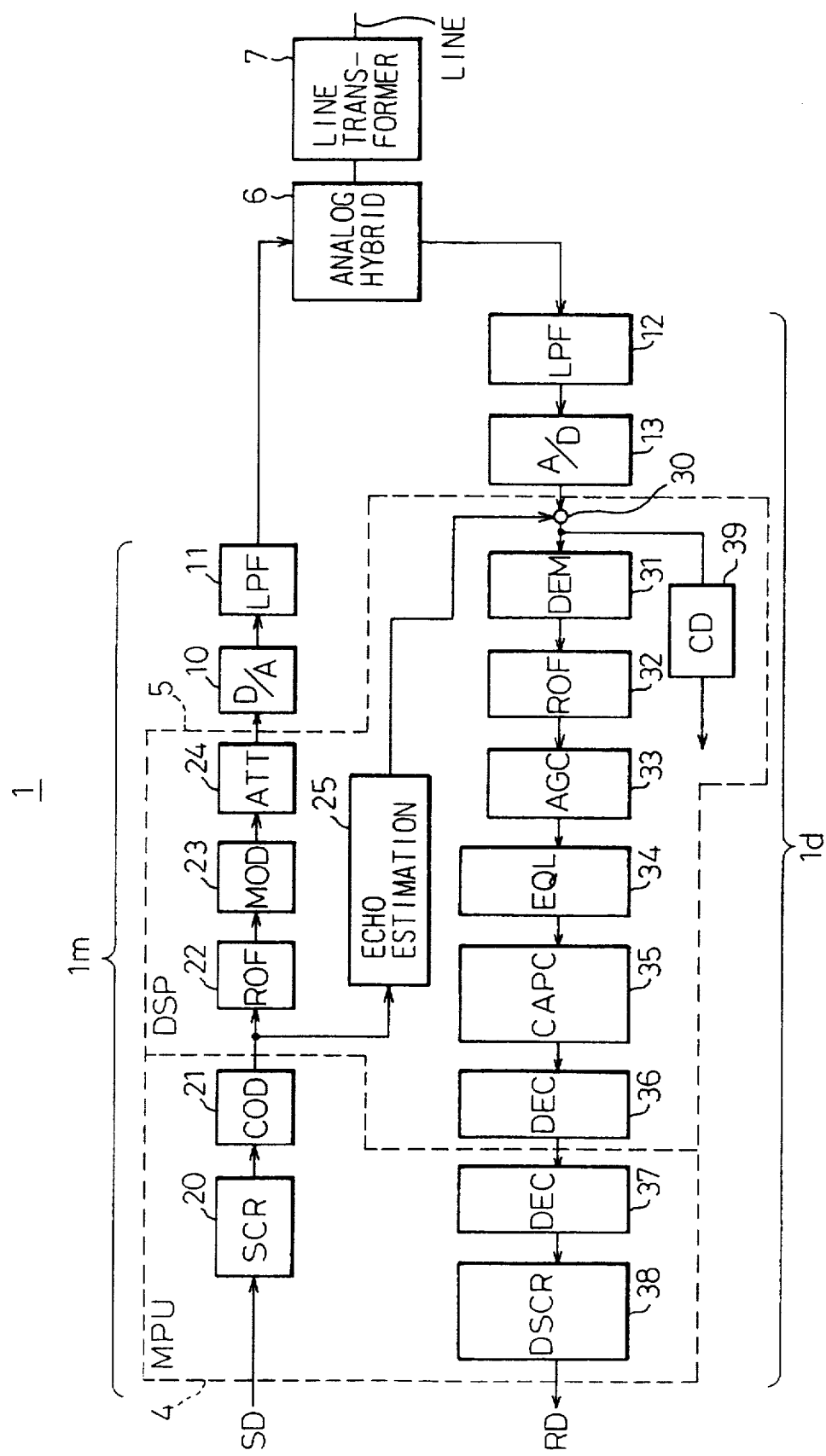
FIG. 1 is an example of a transmission and reception unit formed in a modem to which the present invention is applied.

FIG. 1 is a view illustrating a transmission and reception unit formed in the modem to which the present invention is applied.

In the figure, 1 is a transmission and reception unit provided with a modulation unit 1m for modulating the transmission data SD and a demodulation unit 1d for demodulating the reception signal.

Further, in the figure, 20 is a scrambler (SCR), which scrambles the transmission data SD to make it random. Reference numeral 21 is a coding unit (COD), which encodes the transmission data scrambled by the scrambler 20. Reference numeral 22 is a roll-off filter (ROF), for cutting undesired band components from the coded transmission data. Reference numeral 23 is a modulation unit (MOD), which modulates the signal output from the roll-off filter (ROF) 22 by a modulation wave. Reference numeral 24 is an attenuator (ATT), which adjusts the level of the modulated signal, and 10 is a digital/analog converter (D/A), which converts the digital signal output from the attenuator 24 to the analog signal. Further, 11 is a low pass filter (LPF), for cutting the undesired high frequency components. The above elements constitute the modulation unit 1m.

Further, 25 is an echo estimation unit, which calculates the estimated echo component from the transmission output from the coding unit 21.

Reference numeral 6 is a hybrid circuit, which is connected to the two-wire line and performs the transmission of the transmission signal and the reception of the reception signal.

On the other hand, 12 is a low pass filter (LPF), for cutting the high frequency components from the reception signal supplied from the opposing hybrid circuit. Reference numeral 13 is an analog/digital converter (A/D), which converts the analog signal output from the low pass filter 12 to a digital signal. Reference numeral 30 is an adding unit, which is for subtracting the estimated echo component output from the echo estimation unit 25, from the reception signal from the A/D converter 13. Reference numeral 31 is a demodulation unit (DEM), which demodulates the output of the adding unit 30 by the demodulation wave. Reference numeral 32 is a roll-off filter (ROF), which cuts the undesired band components from the demodulated signal.

Reference numeral 33 is an automatic gain control unit (AGC), which automatically adjusts the level of the output signal from the roll-off filter 32. Reference numeral 34 is an automatic equalizer (EQL), which equalizes the output signal from the AGC unit 33. Reference numeral 35 is a carrier automatic phase compensation unit (CAPC), which automatically compensates for the phase of the carrier signal. Reference numeral 36 is a decision unit, which determines the position of the demodulated signal on the phase plane. Reference numeral 37 is a decoding unit (DEC), which decodes the output signal from the decision unit 36, and 38 is a descrambler (DSCR), which descrambles the data, reproduces the original data, and outputs the reception data RD. Further, 39 is a carrier detection unit (CD), which detects the carrier from the output of the adding unit 30 and generates the carrier detection signal.

The demodulation unit 1d is constituted by the low pass filter 12 and its subsequent elements containing also the carrier detection unit 39.

Further, 4 is a microprocessor (MPU), and 5 is a digital signal processor (DSP). The scrambler 20, the coding unit 21, the decoding unit 37, and the descrambler 38 are included in the MPU 4 and are controlled by a program.

The roll-off filter 22, modulation unit 23, attenuator 24, echo estimation unit 25, demodulation unit 31, roll-off filter 32, AGC 33, equalizer 34, carrier automatic phase compensation unit 35, decision unit 36, and carrier detection unit 39 are included in the DSP 5.

The transmission data SD is output from the low pass filter 11 and then transmitted from the hybrid circuit 6 to the two-wire line via the line transformer 7. Further, the signal from the hybrid circuit 6 is sent to the low pass filter 12 in the demodulation unit 1d.

The echo component is contained in the reception signal from the hybrid circuit 6, but this echo component is removed by the cancellation with the estimated echo component from the echo estimation unit 25 at the adding unit 30. Note, the far-end echo component is not always removed.

A circuit for performing the removal of the far-end echo component is provided in the hybrid circuit (analog hybrid in the figure) 6 in the present embodiment.

First, an explanation will be made of a case where the level of the far-end echo component is small.

Figure 2:
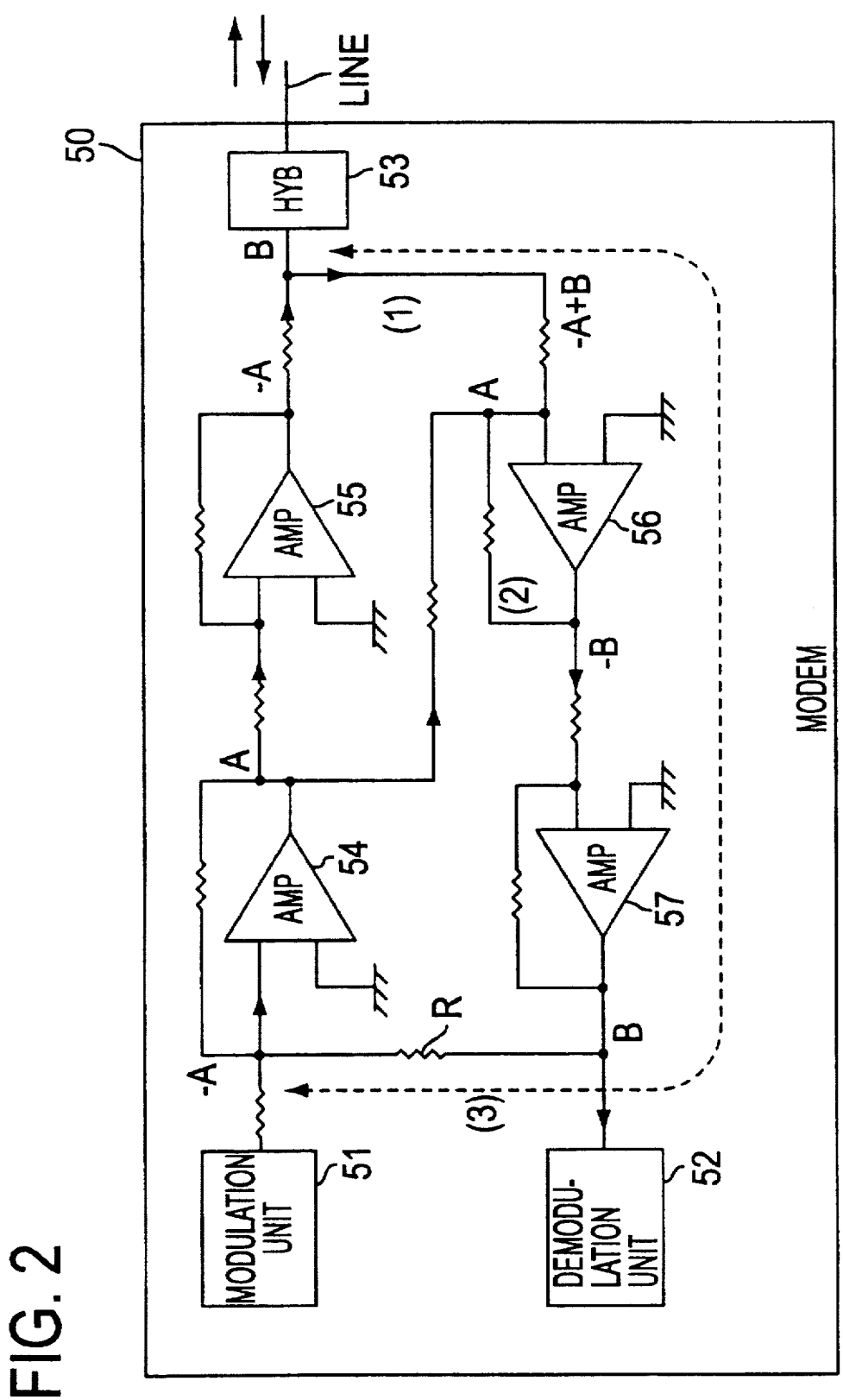
FIG. 2 is an embodiment of the modem according to the present invention.

FIG. 2 shows a circuit for performing the echo cancellation where the far-end echo component is small. All elements thereof are provided in the hybrid circuit except for the modulation unit 51 and the demodulation unit 52. Here, the modem corresponds to the distant modem 102 when referring to FIG. 10. The explanation will be made of the operation of a case where the echo component caused by the transmission carrier from the local modem 101 in FIG. 10 is cancelled.

In FIG. 2, 51 is a modulation unit and 52 is a demodulation unit. These have the same configurations as those of the modulation unit 1m and demodulation unit id of FIG. 1. Also, 53 is a hybrid transformer (HYB).

Further, 54 to 57 are inverting amplifiers (AMP), which inversely amplify the input signal. These inverting amplifiers 54 to 57 constitute the amplifying unit. Note that, a conventional hybrid circuit would be a circuit provided with the inverting amplifier 54 and the inverting amplifier 56.

Further, in FIG. 2, the dotted line indicates the path of the reception carrier signal received from the distant modem.

In FIG. 2, the signal A indicates the transmission carrier output from the modulation unit 51, and signal B indicates the reception signal supplied from the line at the local modem 101 side in FIG. 10 via the hybrid circuit 53. Further, any sign marks attached to the signals A and B indicate the phases of the signals. Note that, where the phase is the "+" side, the sign mark is not shown except in cases where it is particularly necessary.

The transmission carrier −A output from the modulation unit 51 is input to the inverting amplifier 54 and inversely amplified. As a result, the inverting amplifier 54 outputs the phase-inverted transmission carrier A.

The transmission carrier A output from the inverting amplifier 54 is further input to the inverting amplifier 55 and inversely amplified. As a result, the inverting amplifier 55 outputs the transmission carrier −A. Accordingly, the phase of the output of the inverting amplifier 55 and the phase of the output of the modulation unit 51 are equal.

The transmission carrier −A output from the inverting amplifier 55 is mixed with the reception carrier B received via the hybrid circuit 53, becomes a signal −A+B, and is applied to the input terminal of the inverting amplifier 56 (1). Simultaneously, the transmission carrier A output from the inverting amplifier 54 is also applied to the input terminal of the inverting amplifier 56.

Here, the transmission carrier output from the inverting amplifier 55 and the transmission carrier output from the inverting amplifier 54 have opposite phases from each other. For this reason, the component of the transmission carrier A is removed from the signal applied to the inverting amplifier 56 (2), and only the component of the reception carrier B is applied to the inverting amplifier 56.

The reception carrier B is inversely amplified by the inverting amplifier 56, whereby the reception carrier −B is output from the inverting amplifier 56. The reception carrier −B is further applied to the inverting amplifier 57 and inversely amplified, whereby the reception carrier B is output from the inverting amplifier 57.

The phase of the reception carrier output from the inverting amplifier 57 and the phase of the reception carrier input from the hybrid circuit 53 coincide to each other.

The reception carrier B output from the inverting amplifier 57 is applied to the input terminal of the inverting amplifier 54 via a resistor R, superimposed onto the transmission carrier −A, and then input to the inverting amplifiers 54 and 55. This signal B is amplified inversely at the inverting amplifiers 54 and 55 and output to the line via the hybrid circuit 53. The output of the inverting amplifier 57 is output to the line via two inverting amplifiers 54 and 55, therefore the phase of the reception carrier input to the modem 50 and the phase of the reception carrier output from the modem 50 are the same. Further, the reception carrier is amplified in level by the inverting amplifiers 54 to 57, therefore, in the A/D converter in the telephone office, the reception carrier is amplified to a level so that A/D conversion is possible in the region where the linearity of the A/D converter is good.

In this way, by imparting to the distant modem side the facility of amplifying the far-end echo component leaked to the distant modem, it is possible to prevent, even if the level of the far-end echo component is small, this far-end echo component from being distorted. When the echo cancellation in the local modem is performed, this echo cancellation can be performed correctly and therefore a remarkable improvement of the reception performance of the modem can be achieved.

Figure 3:
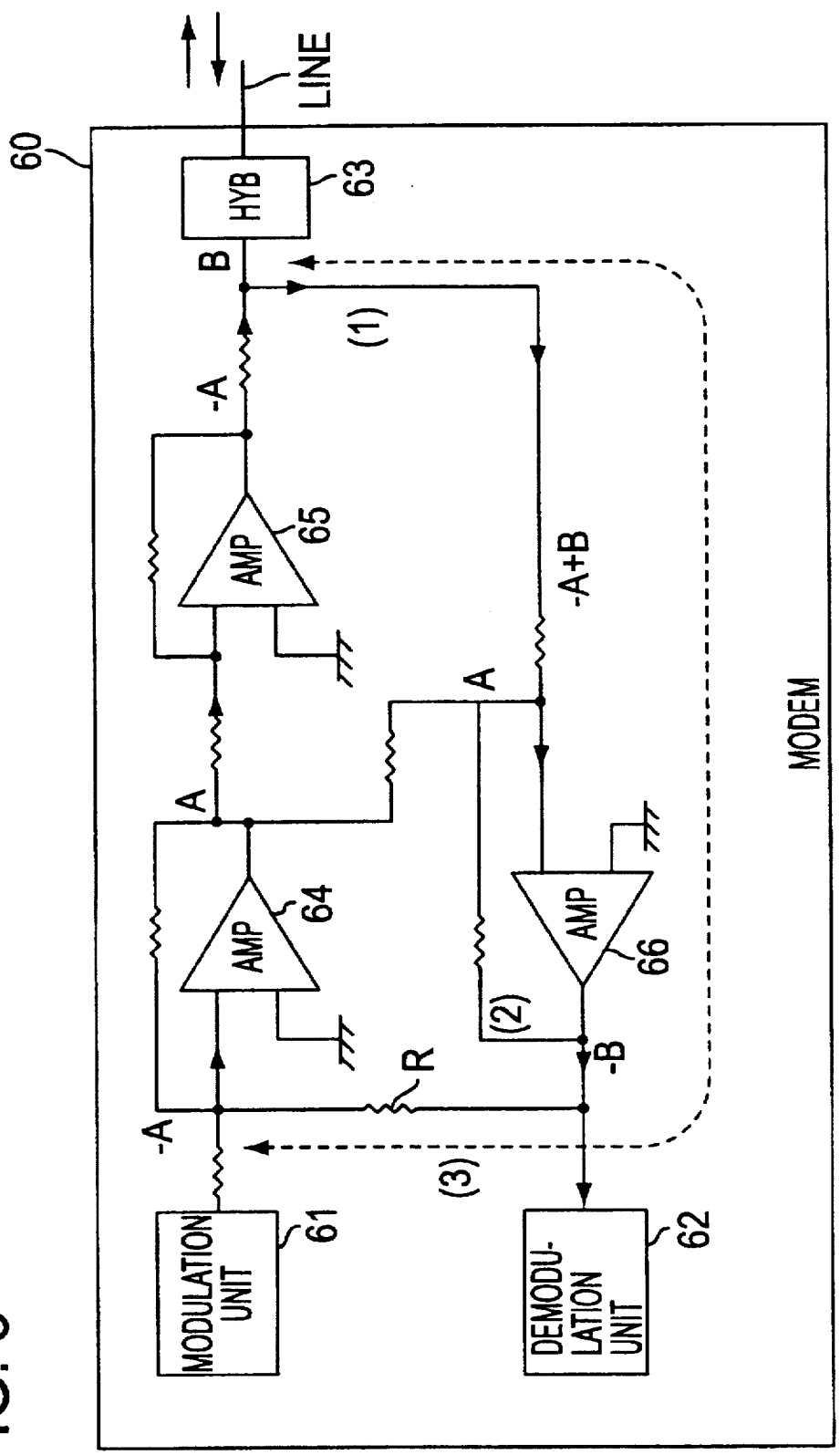
FIG. 3 is another embodiment of the modem according to the present invention.

FIG. 3 is a view of the configuration of a circuit for performing the echo cancellation where the far-end echo component is too large. Note that, whether the far-end echo component is large or small is determined according to for example whether the impedance of the subscriber section between the distant modem 102 and the telephone office 104 of FIG. 10 is large or small.

In FIG. 3, 60 is a modem, 61 is a modulation unit, 62 is a demodulation unit, and 63 is a hybrid transformer (HYB). They have the same configurations as the modulation unit 51, the demodulation unit 52, and the hybrid transformer 53 illustrated in FIG. 2. Further, the modem 60 corresponds to the distant modem 102 in FIG. 10.

Further, 64 to 66 are inverting amplifiers (AMP). These inverting amplifiers 64 to 66 constitute the inversion unit. Further, in the figure, A is a transmission carrier output from the modulation unit 61, and B is a reception carrier received from the line at the local modem 101 side in FIG. 10. The sign marks attached to A and B indicate the phases of the signals. Further, the dotted line indicates the path of the reception carrier signal received from the modem connected to the line.

The transmission carrier −A output from the modulation unit 61 is input to the inverting amplifier 64, amplified inversely, and output as the transmission carrier A. The transmission carrier A output from the inverting amplifier 64 is further input to the inverting amplifier 65, amplified inversely, and output as the transmission carrier −A.

The transmission carrier −A output from the inverting amplifier 65 is mixed with the reception carrier B supplied from the other modem and input to the inverting amplifier 66 (1). On the other hand, the transmission carrier A output from the inverting amplifier 64 is also input to the inverting amplifier 66. Here, since the components of the transmission carriers A are opposite in phase at the output of the inverting amplifier 64 and the output of the inverting amplifier 65, the components of the transmission carriers A are cancelled, and only the reception carrier component B is input to the inverting amplifier 66. Then, the reception carrier B input to the inverting amplifier 66 is amplified inversely. As a result, the reception carrier −B having an inverted phase is output from the inverting amplifier 66.

The reception carrier −B output from the inverting amplifier 66 is further applied to the input terminal of the inverting amplifier 64 via the resistor R, superimposed onto the transmission carrier −A, and then amplified inversely by the inverting amplifiers 64 and 65. Here, the reception carrier B input to the modem 60 is output again from the modem 60 via three inverting amplifiers 66, 64, and 65, therefore the phase of the input reception carrier and the phase of the output reception carrier become opposite to each other.

Figure 4:
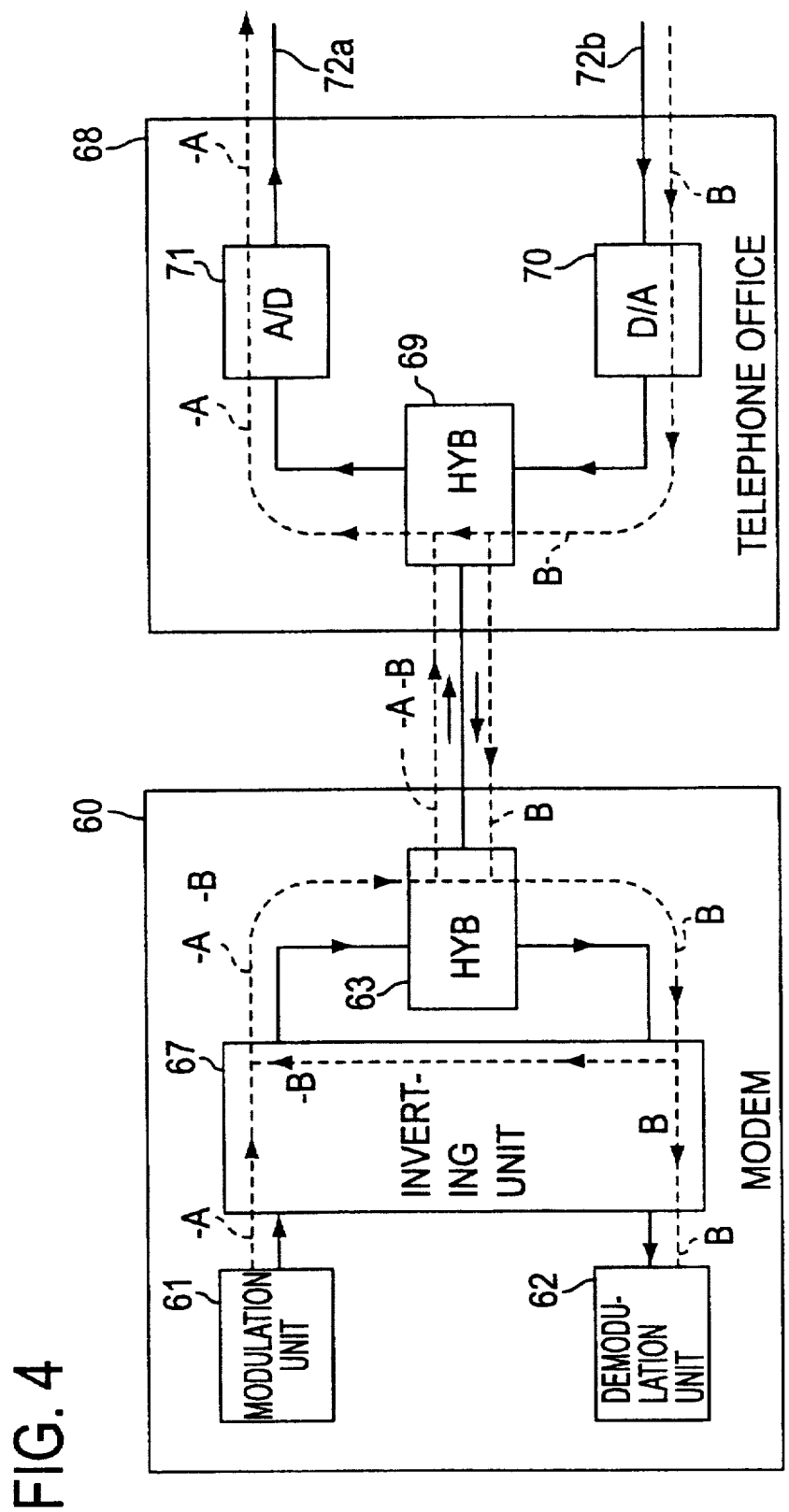
FIG. 4 is a view explaining an echo cancellation operation by the modem illustrated in FIG. 3.

FIG. 4 is a view of the flow of the signal between the modem 60 and the telephone office 68 to which the modem 60 is connected. In the figure, the dotted line indicates the path of the reception carrier and the transmission signal from the modulation unit 61.

In FIG. 4, 60 is a modem, 61 is a modulation unit, 62 is a demodulation unit, and 63 is a hybrid circuit (HYB). These are the same as the corresponding parts of FIG. 3. Further, 67 is an inversion unit and corresponds to a combination of the inverting amplifiers 64 to 66 of FIG. 3.

On the other hand, in the telephone office 68, 69 is a hybrid circuit (HYB), 71 is an A/D converter (A/D), and 70 is a D/A converter (D/A). The output of the A/D converter 71 is transmitted to the line 72a, and the signal received from the line 72b is applied to the D/A converter 70 and converted to an analog signal.

The signal output from the hybrid circuit 63 in the modem 60 to the two-wire line is the signal −A−B, i.e., a mixture of the transmission carrier A from the modem 60 and the reception carrier B from the other modem (not illustrated) opposing to the modem 60. On the other hand, the signal supplied to the hybrid circuit 69 in the telephone office 68 is the reception carrier B output from the other modem opposing to the modem 60. One part of the reception carrier B is leaked from the hybrid circuit 69 to the A/D converter 71 side.

Here, the reception carrier output from the D/A converter 70 and the reception carrier contained in the signal output from the modem 60 have opposite phases to each other. For this reason, when looking at the signal output from the hybrid circuit 69 in the telephone office 68 to the line 72a, the reception carrier B from the D/A converter 70 and the reception carrier −B from the modem 60 are cancelled, and only the transmission carrier −A from the modem 60 remains, therefore most of the far-end echo component is removed. Accordingly, only the transmission carrier −A from the modem 60 is supplied to the A/D converter 71 in the telephone office 68 and is transmitted to the other modem opposing to the modem 60 without the far-end echo.

In this way, a signal having a phase opposite to the phase of the reception carrier received from the opposing modem is output from the modem, therefore the far-end return loss at the telephone office is reduced, the amount of echo cancellation is increased, and, at the same time, a conspicuous improvement of the reception performance of the modem can be achieved.

Figure 5:
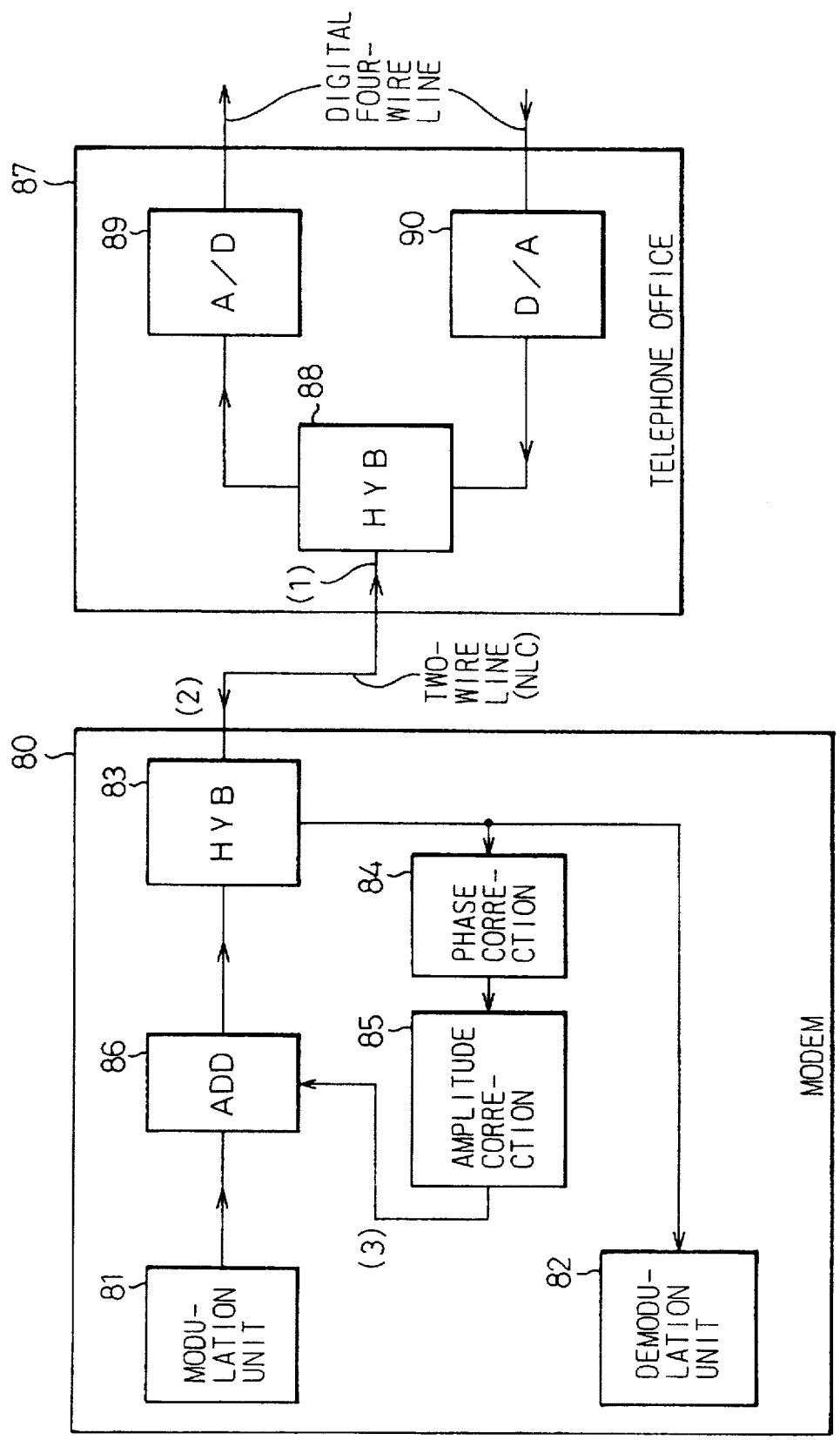
FIG. 5 is a view explaining an example in which characteristic compensation is further added to the embodiment of the present invention.

FIG. 5 is a block diagram of an example in which a characteristic compensation is further added to the embodiment of the present invention.

In FIG. 5, 80 is a modem. Also, 81 is a modulation unit, 82 is a demodulation unit, and 83 is a hybrid circuit (HYB). Further, 84 is a phase correction unit, 85 is an amplitude correction unit, and 86 is an adding unit. These are constituent parts newly added in the present figure.

On the other hand, in the telephone office 87, 88 is a hybrid circuit (HYB), 89 is an A/D converter, and 90 is a D/A converter.

Figure 6A:
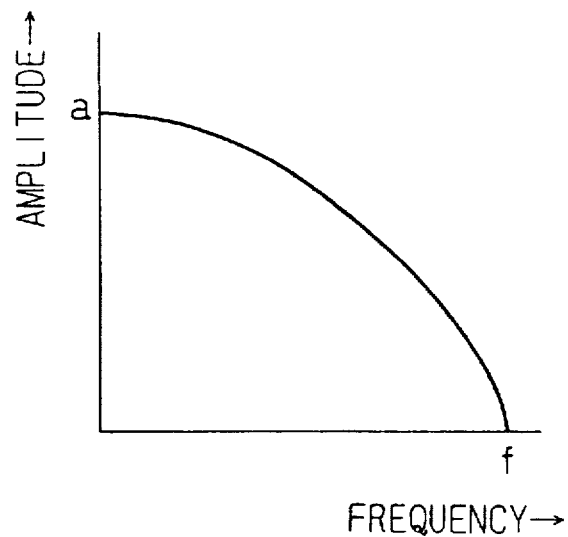
FIGS. 6A and 6B are views of amplitude and phase characteristics of a signal received by a modem from a telephone office.
Figure 6B:
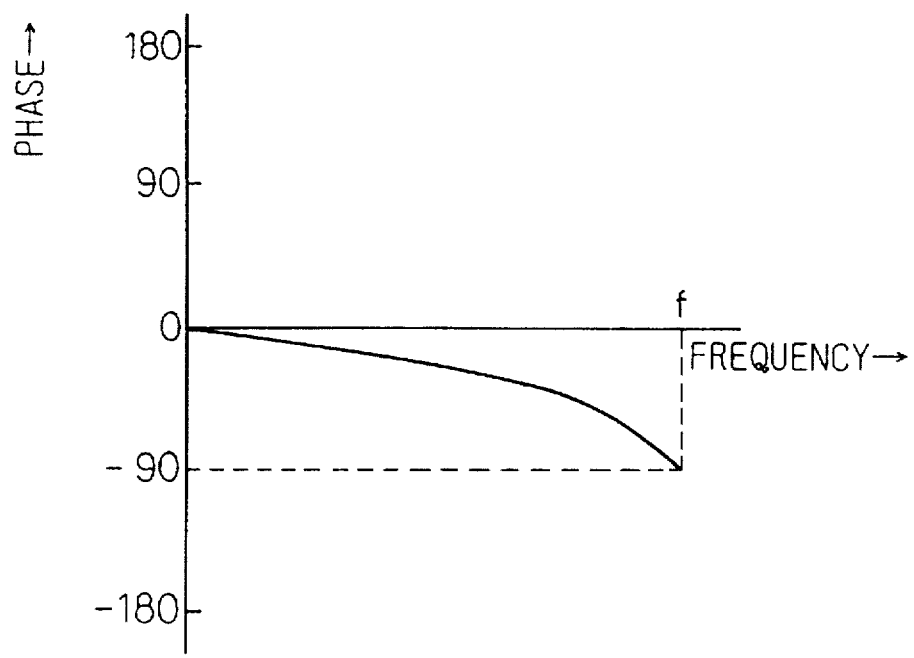

Here, the signal (1) transmitted from the hybrid circuit 88 in the telephone office 87 via the two-wire line (nonload cable NLC in the figure) to the modem 80 is received (2) by the hybrid circuit 83 of the modem 80 as a signal having the characteristics as shown in FIGS. 6A and 6B in accordance with the characteristics of the line. FIG. 6A shows a frequency vs amplitude relationship of the signal; and FIG. 6B shows an example of a frequency vs phase relationship. Here, it is assumed that the value of the amplitude of the signal output from the hybrid circuit 88 in the telephone office 87 is a.

In the case of FIG. 6A, in the range where the frequency is low, the amplitude has a value as large as a. However, along with a rise of the frequency, the amplitude of that signal becomes smaller, and at the frequency f, the amplitude becomes almost 0.

In the case of FIG. 6B, in the range where the frequency is low, a variation has not occurred in the phase. However, along with the rise of the frequency, a phase lag gradually occurs, and when the frequency becomes near f, the phase lag of the signal becomes 90°.

In this way, the characteristic of the signal transmitted from the telephone office 87 to the modem 80 changes according to the state of the line (NLC), and accordingly, even if the far-end echo component is attenuated or amplified so as to remove the far-end echo component at the modem 80, the characteristic of the signal received by the other modem (not illustrated) opposing to the modem 80 becomes different from the characteristic of the signal output from the opposing modem due to the change of characteristic of the signal. Accordingly, a sufficient echo cancellation cannot be carried out at the opposing modem, and there is a possibility that data errors will still occur in the demodulation result.

Therefore, the above phase correction unit 84 and amplitude correction unit 85 are used to correct the characteristics of the signal received from the telephone office 87. The result is then superimposed onto the transmission signal and transmitted to the telephone office 87.

Figure 8A:
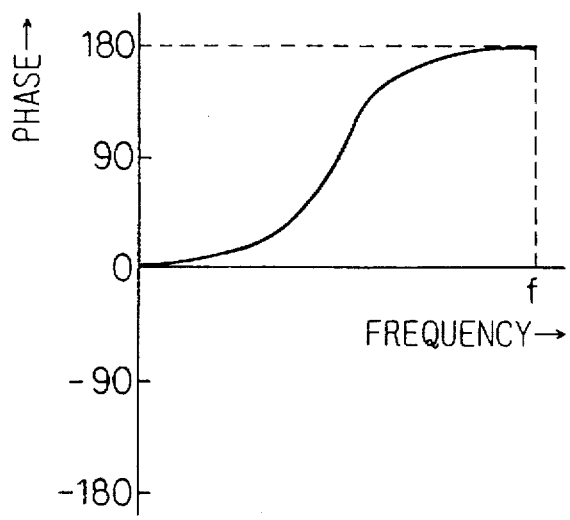
FIGS. 8A, 8B, and 8C are views of phase correction characteristics of a phase correction circuit, amplitude correction characteristics of an amplitude correction circuit, and an example of the amplitude correction characteristics.
Figure 8B:
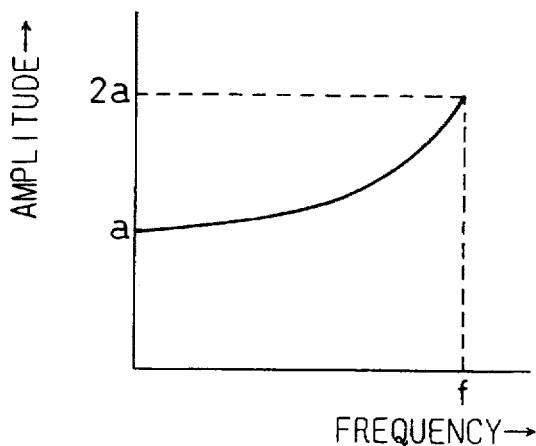
Figure 8C:
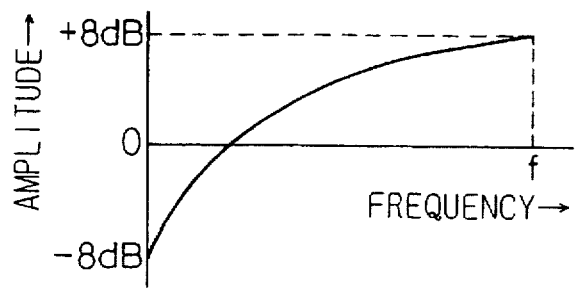

FIG. 7 is a view of one part in the modem 80 of FIG. 5. Further, FIG. 8A shows an example of the phase correction characteristics of the phase correction circuit 84; and FIGS. 8B and 8C show the amplitude correction characteristics by the amplitude correction circuit 85, respectively. The reception signal output from the hybrid circuit 83 of FIG. 7 to the demodulation unit side is sent to the demodulation unit on one hand and, at the same time, input to the phase correction circuit 84 on the other hand.

The phase correction circuit 84, as shown in FIG. 8A, corrects the input signal by causing a phase lag with respect to the signal component having a low frequency and gradually reducing the phase lag along with the rise of the frequency so that the phase lead is caused by 180° at a point where the frequency becomes f.

The input signal corrected in phase by the phase correction circuit 84 is now input to the amplitude correction circuit 85. The amplitude correction circuit 85 attenuates the amplitude of the signal by −8 dB in the part where the frequency is low as shown in FIG. 8C as one example, gradually reduces the amount of amplitude attenuation of the signal along with the rise of the frequency signal, and amplifies the amplitude of the input signal by +8 dB at the frequency f.

The reception signal (received carrier) corrected in both phase and amplitude in this way is superimposed onto the transmission carrier output from the modulation unit 81 by the adding unit 86 and transmitted via the hybrid circuit 83 to the telephone office 87.

Referring to FIG. 8B, the amplitude of the signal output from the hybrid circuit 83 becomes the amplitude a the same as the amplitude a of the input signal in the region where the frequency is low, gradually become higher along with the rise of the frequency, and thereby the amplitude is corrected to have the amplitude 2a twice the amplitude a of the signal when output from the telephone office 87 at the frequency f and then the thus corrected signal is transmitted to the telephone office 87.

On the other hand, with respect to the phase, as shown in FIG. 8A, a signal is corrected such that there is no phase deviation in the region where the frequency is low, the phase is gradually led along with the rise of frequency and the phase is led by 180° at the frequency f, and then the thus corrected signal is transmitted to the telephone office 87.

Here, the signal which is transmitted from the telephone office 87 to the modem 80 and transmitted from the modem 80 to the telephone office 87 again passes through the line NLC twice in total. That is, the amount of change of the characteristics of the signal becomes twice the amount of change shown in FIGS. 6A and 6B. Accordingly, a signal having a reverse characteristic relative to the reception signal is not simply returned back to the telephone office 87. Rather, a signal having double the reverse characteristics is transmitted to the telephone office 87 side as the corrected signal.

Due to this, when the telephone office 87 receives the signal, the characteristics of the signal from the modem 80 have become almost flat and almost equal to the characteristics of the signal input from the D/A converter 90 to the hybrid circuit 88. For this reason, the reception carrier component from the opposing modem can be almost completely cancelled by the hybrid circuit 88, and thereby an improvement of the reception performance at the opposing modem can be achieved.

Figure 9:
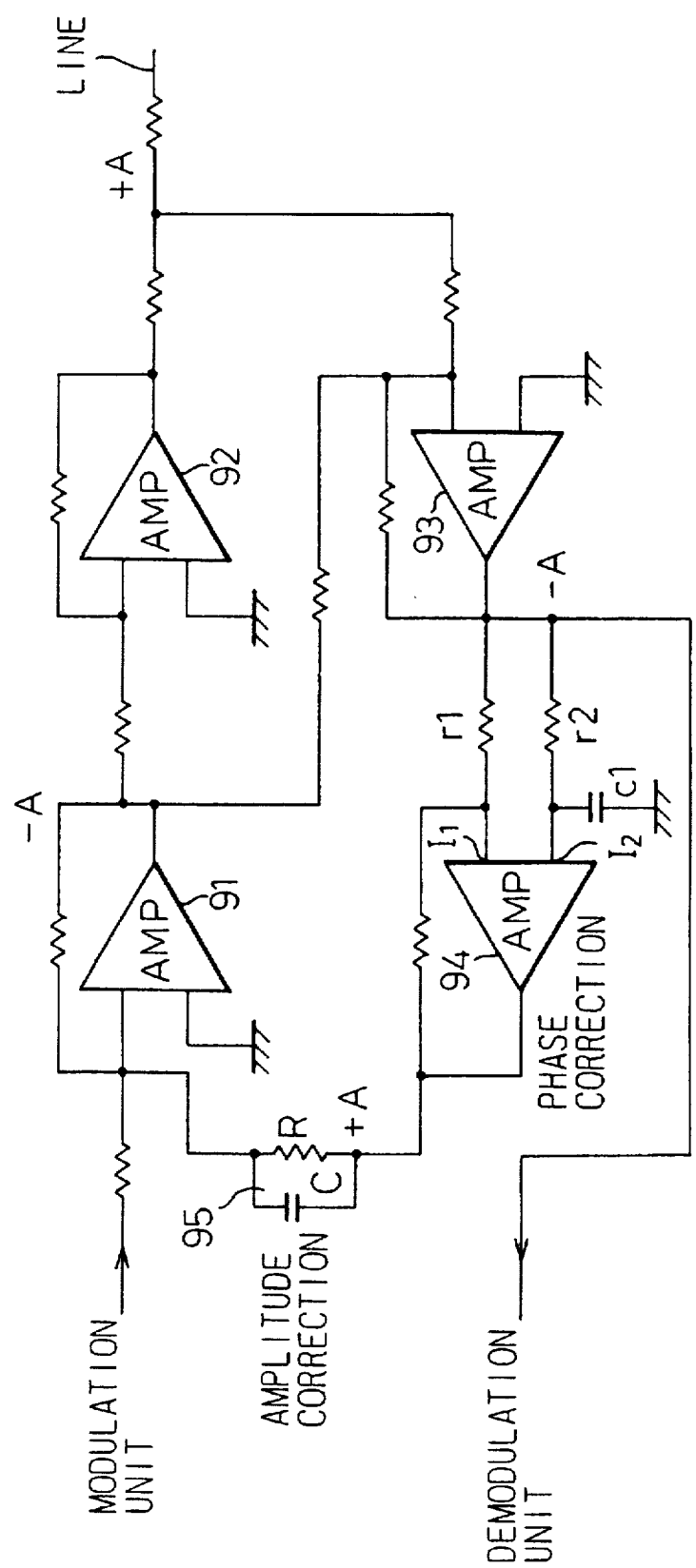
FIG. 9 is a view illustrating the circuit of FIG. 7 in further detail.

FIG. 9 is a further detailed view of the hybrid circuit realizing the above embodiment.

In FIG. 9, 91 to 94 are amplifiers (AMP). Further, 95 is a RC circuit in which the resistor R and the capacitor C are connected in parallel.

Here, the amplifier 94 constitutes the above phase correction circuit, and the RC circuit 95 constitutes the above amplitude correction circuit. Note that, the three amplifiers 91 to 93 correspond to the three inverting amplifiers of FIG. 3, therefore an explanation will be omitted of the operations as they are the same as in FIG. 3.

The reception carrier signal A input to the amplifier 93 is amplified inversely by the amplifier 93 and becomes the signal −A. Here, the output of the amplifier 93 is applied to two input terminals of the amplifier 94, that is, the input terminal $I_1$ via the resistor r1 and the input terminal $I_2$ via the parallel circuit of the resistor r2 and the capacitor c1, respectively.

Due to this configuration, the phase of the input signal is corrected to exhibit the characteristic as shown in FIG. 8A.

Note that, the output signal from the amplifier 93 is applied also to the demodulation unit.

The signal output from the amplifier 94 is input to the RC circuit 95. The RC circuit 95 corrects the amplitude of the input signal based on the characteristics as shown in FIGS. 8B and 8C. The signal output from the RC circuit 95 is superimposed onto the signal from the modulation unit and output to the line via the amplifiers 91 and 92.

In FIG. 9, the phase of the input reception carrier and the phase of the reception carrier output from the amplifier 92 become equal, and the circuit of FIG. 9 acts so as to amplify the reception carrier, that is, is similar to the circuit of FIG. 2. Note that, so as to attenuate the reception carrier, for example, by removing the amplifier 57 (FIG. 2), a function the same as that of the circuit of FIG. 3 can be imparted.

As mentioned above, according to the present invention, particularly where the far-end echo component is small, the far-end echo component is amplified at the distant modem to a degree that A/D conversion is possible, when A/D conversion of signals is achieved at the facilities such as telephone offices lying between transmission apparatuses, using the region of the A/D converter where the linearity is good, whereby it becomes possible to sufficiently perform the echo cancellation at the modems to a degree that data errors are not generated.

On the other hand, by outputting, at the distant modem, the phase component opposite to the far-end echo component, the far-end echo component can be cancelled at the intervening facilities such as telephone offices. For this reason, even in a case where the far-end echo component is too large, the echo cancellation at the modems can be sufficiently carried out to a degree that does not cause data errors.

In this way, by selecting adequate processing in accordance with the state of the far-end echo, it becomes possible to achieve an improvement of the reception performance of a transmission apparatus such as a modem.

What is claimed is:

1. A transmission apparatus connected to a line via a hybrid circuit provided with
    a transmission unit which generates a transmission signal transmitted to the line via said hybrid circuit and
    a reception unit which receives the reception signal received from the line via said hybrid circuit, wherein
    provision is made of a means for superimposing the reception signal applied to said hybrid circuit onto said transmission signal so that the transmission signal onto which the reception signal is superimposed by said superimposing means is transmitted to the line via said hybrid circuit.

2. A transmission apparatus according to claim 1, wherein:
    said superimposing means provides an amplifying means for amplifying said reception signal and
    the reception signal amplified by said amplifying means is superimposed onto said transmission signal.

3. A transmission apparatus according to claim 2, wherein said amplifying means is constituted by even number stage inverting amplifiers.

4. A transmission apparatus according to claim 1, wherein:
    said superimposing means provides an inverting means for inverting said reception signal and outputting the result; and
    the reception signal inverted by said inverting means is superimposed onto said transmission signal.

5. A transmission apparatus according to claim 4, wherein said inverting means is constituted by odd number stage inverting amplifiers.

6. A transmission apparatus according to claim 5, wherein:
    said inverting means provides
    a first inverting amplifier which inversely amplifies the transmission signal output from the transmitting means,
    a second inverting amplifier which inversely amplifies the output signal from said first inverting amplifier and outputs the amplified signal to said hybrid circuit, and
    a third inverting amplifier which receives as its inputs the output signal from said second inverting amplifier, the reception signal received via said hybrid circuit, and the output of said first inverting amplifier, and performs inverse amplification of the input signal so that the output of said third inverting amplifier is applied to said first inverting amplifier.

7. A transmission apparatus according to claim 1, wherein:
    said superimposing means provides a means for correcting the characteristics of the signal received from opposing equipment via the line so that the reception signal corrected in characteristics by said correcting means is superimposed onto the transmission signal to output.

8. A transmission apparatus connected to a line via a hybrid circuit provided with
    a transmission unit which generates a transmission signal transmitted to the line via said hybrid circuit and
    a reception unit which receives a reception signal received form the line via said hybrid circuit, said reception unit including
    mean for superimposing the reception signal applied to said hybrid circuit onto said transmission signal, the transmission signal onto which the reception signal is superimposed by said superimposing means being transmitted to the line via said hybrid circuit,
    said means for superimposing having amplifying means for amplifying said reception signal, the reception signal amplified by said amplifying means being superimposed onto said transmission signal, said amplifying means including even number stage inverting amplifiers, and
    said amplifying means provides
    a first inverting amplifier which inversely amplifies the transmission signal output from the transmitting means,
    a second inverting amplifier which inversely amplifies the output signal from said first inverting amplifier and outputs the amplified signal to said hybrid circuit,
    a third inverting amplifier which receives as its inputs the output signal from said second inverting amplifier, the reception signal received via said hybrid circuit, and the output of said first inverting amplifier, and performs inverse amplification of the input signal, and
    a fourth inverting amplifier which inversely amplifies the output of said third inverting amplifier so that the output of said fourth inverting amplifier is applied to said first inverting amplifier.

* * * * *